UNITED STATES PATENT OFFICE.

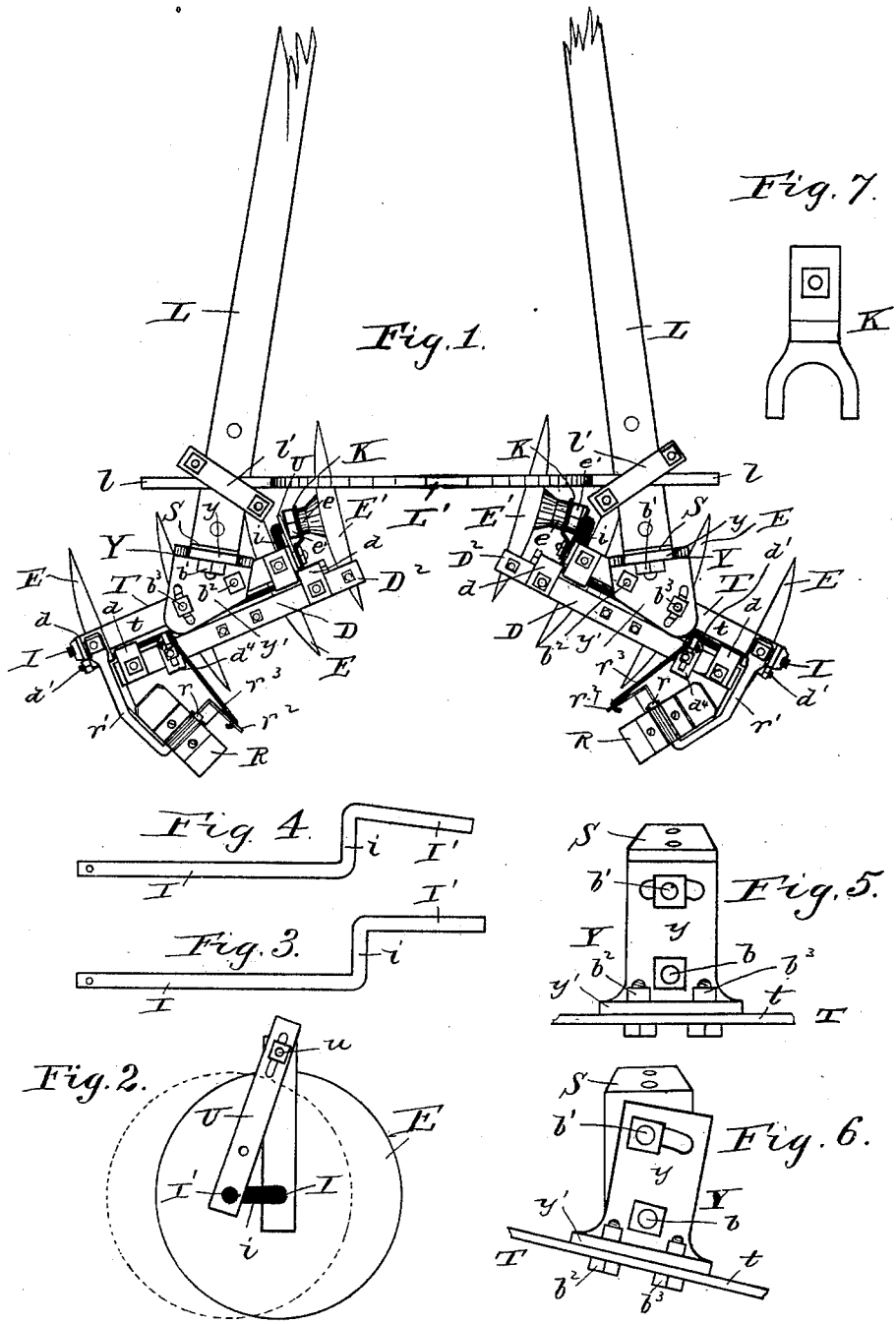

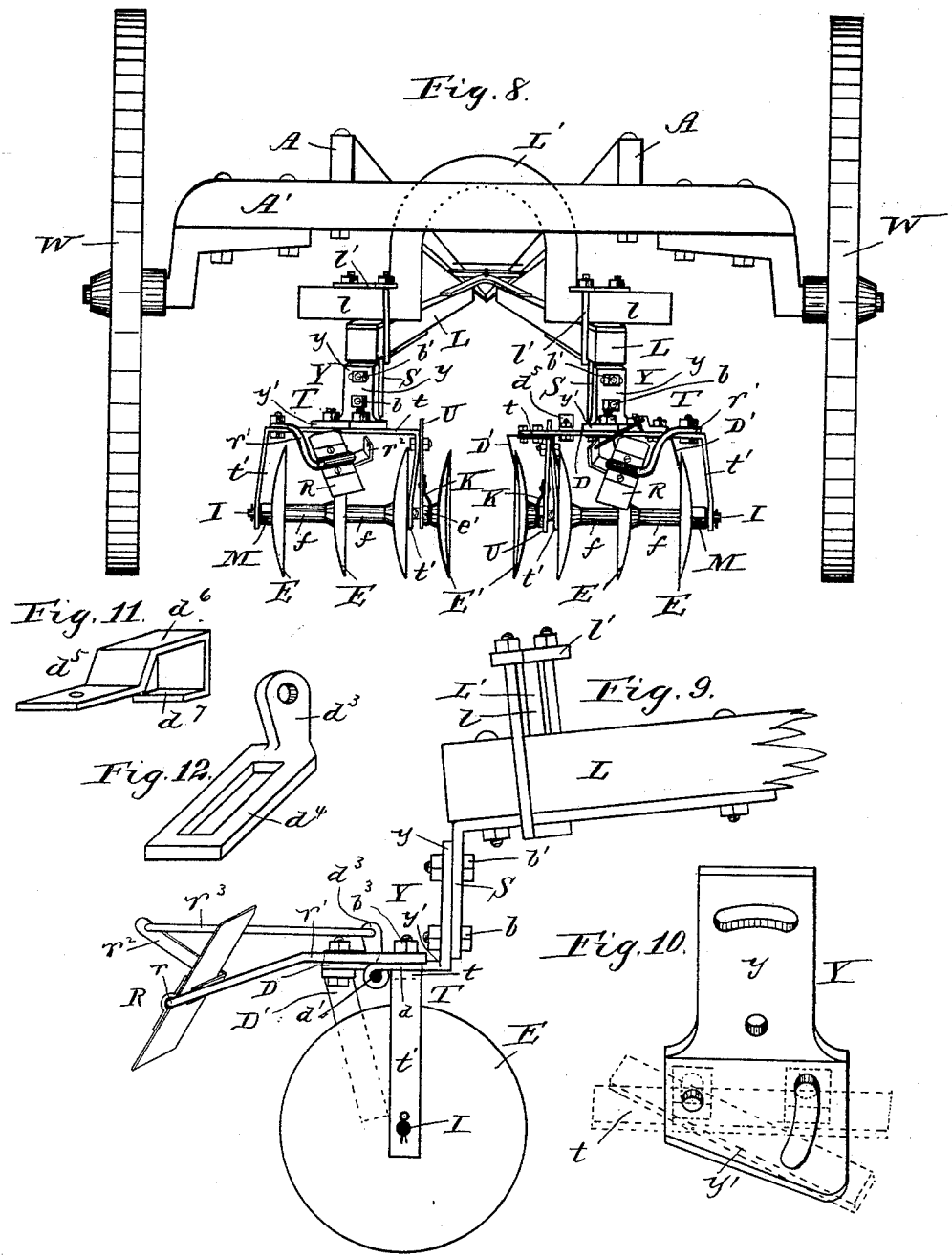

HENRY M. ROSE AND GEORGE L. ROSE, OF WATERMAN, ILLINOIS.

DISK CULTIVATOR.

SPECIFICATION forming part of Letters Patent No. 435,655, dated September 2, 1890.

Application filed November 25, 1889. Serial No. 331,533. (No model.)

*To all whom it may concern:*

Be it known that we, HENRY M. ROSE and GEORGE L. ROSE, citizens of the United States, residing at Waterman, in the county of De Kalb and State of Illinois, have invented certain new and useful Improvements in Disk Cultivators; and we do declare the following to be a full, clear, and exact description of the invention, such as will enable others skilled in the art to which it appertains to make and use the same.

In the employment of disk and other cultivators much difficulty has been experienced in obtaining an efficient disintegration and stirring of the soil in immediate proximity to the plants without at the same time injuring them.

It is the object of our invention to obtain this desired degree or character of cultivation, and thus cause a growth and development of the plant much beyond that which is attained by the ordinary cultivator.

To this end our invention relates to the arrangement and mode of mounting of the end disk.

The invention further relates to a mode of constructing and securing the parts whereby they are more accessible for and positive in their adjustments.

The invention further relates to means whereby the scrapers may be conveniently operated by a movement of the driver's feet without requiring the latter to be removed from the gang-frames or the control of the gangs to be interrupted.

The invention further relates to a simplification of the construction of the machine whereby it is materially cheapened in cost.

In order to make our invention more clearly understood, we have shown in the accompanying drawings means for carrying the same into practical effect, without, however, thereby limiting our invention or claims to the exact combinations or modes of operation shown and described.

In said drawings, Figure 1 is a plan view of the draft-bars, connecting-yoke, and gangs of a disk cultivator embodying our invention. Fig. 2 is a view of the inner end of one of the gangs, the end disk being shown in dotted lines. Fig. 3 is a plan view of one form of the supplemental axis for the end disk. Fig. 4 is a similar view of a different form by which the end disk is set at an angle to the other disks and more nearly parallel with the line of draft. Fig. 5 is a rear view illustrating the angle-plate by which the gang-yoke is carried and adjusted either horizontally or vertically. Fig. 6 is a similar view indicating the manner of turning the plate to secure an adjustment in vertical planes. Fig. 7 is a side view of a securing-yoke by which the end disk is secured upon its axis. Fig. 8 is a rear elevation of the cultivator. Fig. 9 is a side view of a portion of the same. Fig. 10 is a perspective view of the angle-plate. Fig. 11 is a perspective view of a stop-plate, by which the oscillation of the scraper-bar is limited in each direction. Fig. 12 is a perspective view of an adjustable plate and lever-arm through which the scraper-bar is connected with the actuating-treadle.

Referring to the drawings, A represents the converging beams of the tongue secured at their rear ends to the axle-tree A'. The latter is mounted in any suitable manner upon the wheels W, so as to be at a considerable height above the ground, as shown in Fig. 8.

L L are the drag-beams, of any preferred construction, preferably converging at their forward ends, as shown, and there connected in a well-known manner with the tongue or draft-frame. At their rear ends the drag or draft beams are spaced and held apart by the usual arch L', the horizontal arms $l$ of which are secured to said beams by clamps $l'$. By these clamps the beams L and the gangs carried thereby may be adjusted farther apart or nearer together, as may be desired, the clamps being for this purpose moved inward or outward along arms $l$ and tightened up at the proper points.

S S indicate vertical portions of or brackets secured to the draft-bars L.

T T indicate the gang-yokes, having horizontal portions $t$ and downwardly-extending arms $t'$, which receive and form bearings for the gang-axis I. The latter passes loosely through the usual central sleeve (not shown) and spacing-sleeves $f$, by which latter and by nuts M, screwed upon the central sleeve, the disks E, of the usual concave form, are secured. The gang thus formed is free to revolve upon the axis I.

Y indicates the plates, which I term "angle-plates," though they may vary from the form illustrated, by which the gang-yokes are adjustably secured to the draft-bars L. Said plates are formed with vertical portions $y$, adapted to be secured in various positions to the brackets S, and with horizontal portions $y'$, which may be similarly secured to the gang-yokes T. The preferred means of fastening consist of a horizontal pivot-bolt $b$, upon which the plate Y may be oscillated and adjusted relative to the bracket S, of a horizontal clamp-bolt $b'$, passing through an enlarged or slotted hole or holes in said portion $y$ and bracket S, by which the former may be secured in the position to which it has been adjusted, and of similar pivot and clamp bolts $b^2$ $b^3$, by which the yoke of the gang may be adjusted horizontally upon the plate portion $y'$.

D is a movable bar, preferably parallel with and hinged by clips $d$ and hinge-rod $d'$ to the portion $t$ of the gang-yoke.

D' are scrapers carried by said bar and bearing at their ends against the concave faces of the disks, along which they are movable from the axis to the periphery of the disks, and vice versa, by the rocking of the bar D. Such motion may be effected by the operator, when it is desired to scrape the disks, through various instrumentalities. For many reasons the means illustrated is convenient.

R is a treadle mounted pivotally at about its middle upon a pin or axis $r$, carried by a bracket-arm $r'$, secured rigidly to the gang-yoke. The axes $r$ $r$ are situated within convenient reach from the driver's seat.

$r^2$ is an upwardly-extending arm carried rigidly by the treadle and connected by a link $r^3$ with a similar arm $d^3$, rigidly mounted upon the scraper-bar D. The oscillation of the treadle under the foot of the operator may thus be communicated to the scraper-bar and scrapers in an obvious manner. It will be understood, however, that the treadle may be mounted directly upon the bar D. The arm $d^3$ is carried by an adjustable slotted plate $d^4$, Fig. 12, by the adjustment of which upon the scraper-bar the convenient position of the treadle may be secured.

$d^5$ is a stop-plate secured to the scraper-bar. It has a portion $d^6$, which passes above the yoke portion $t$, and a lip $d^7$, which lies below said yoke portion. By these parts $d^6$ $d^7$ the oscillation of the scrapers is limited in an obvious manner, preventing them from striking the sleeves or nuts at the centers of the disks or from passing beyond the peripheries of the disks and springing out of place. When the inner disk or end disk E' of a gang is set at an angle to the next disk, there is a liability under some conditions of soil, as where it is wet, of the space between said disks becoming choked. This we have obviated by setting the end disk at a point in advance of the next disk of the gang, with its axis out of line and in front of the axis of the gang, mounting said disk upon a supplementary axis, which is to a certain extent (and may be entirely) independent of the axis of the gang. It is also often desirable to have the inner disk cut less deeply than the next, but at the same time not interfere with the full depth of cut of the next disk and the other disks of the gang. This we have effected by mounting the end disk so as to be vertically adjustable independent of the gang. This may be done in various ways. A very simple and convenient means for so mounting the end disk consists in a cranked shaft I $i$ I', Fig. 3. The part I constitutes the axis of the gang already referred to. $i$ is an offset or crank, and I' is a wrist carried by the part $i$ and out of line with the part I. The end disk E' is mounted upon the wrist I', and by turning the shaft upon the part I as an axis, and by then clamping to the gang-yoke by bolt $u$ the upper slotted end of plate U, the lower end of which encircles the wrist I', Fig. 2, the said end disk may be adjusted and secured at such height relative to the rest of the gang as to make any desired depth of cut relative thereto. By making the wrist I' at an angle to the axis I, Fig. 4, the end disk may be set at a different angle to the line of draft from the others.

In order to entirely inclose the inner or forward end of the hub of the inner disk for the complete exclusion of dirt, the end of the wrist I' does not pass through said end of the hub; but the said disk is kept upon its shaft by means of a securing-yoke K, Figs. 1 and 7, which incloses the hub $e$ of the inner disk just inside of a shoulder or flange $e'$, and is bolted at $k$ to the plate or brace U.

The scraper-bar is provided with an extension D², by means of which a scraper for the inner disk is suitably carried.

It will be understood that so far as the use of the draft-bar, bracket S, and angle-plate Y are concerned other cultivating devices may be substituted for the gang of disks.

Having thus described our invention, what we claim is—

1. In a disk cultivator, an inclined disk-gang having its end disk set with its axis out of line and in advance of the axis of the main portion of the gang and at an angle to the said main axis, substantially as set forth.

2. In a disk cultivator, the combination, with the draft-frame, of independent disk-gangs each carrying an inner disk which travels next to the plants, said inner disks being mounted upon an axis adjustable relative to the main axes of the gangs, substantially as set forth.

3. In a disk cultivator, a disk-gang having a cranked axle adjustable therein and an end disk mounted upon the wrist of said crank, substantially as set forth.

4. The combination, with a disk-gang, of a supplemental shaft or axis mounted directly thereon, an end disk carried by said axis, and a link or rod for adjusting the position of said axis relative to the remainder of the gang, substantially as set forth.

5. The combination, with a disk-gang, of a cranked axle mounted and adjustable therein and having its wrist bent at an angle to the main portion of the axle, and an end disk mounted on said wrist, substantially as set forth.

6. In a disk cultivator, the combination, with a disk-gang, of a supplemental axis situated in advance of the axis of the gang and adjustable relative thereto, and an end disk mounted on said axis, substantially as set forth.

7. The combination, with a disk-gang, of a series of scrapers for the disks, a bar carrying said scrapers and movable to actuate the same, a pivoted foot-treadle, and connections between said treadle and bar, substantially as set forth.

8. The combination, with a disk-gang, of a yoke having a horizontal portion, a draft-bar having a vertical portion or bracket, an angle-plate having a vertical portion adjustable on said bracket and a horizontal portion on which said yoke is adjustable, and means for clamping the angle-plate to said parts, substantially as set forth.

9. The combination, with the draft-bar having the bracket S, of the gang-yoke having the flat horizontal bar $t$, the angle-plate Y, having the parts $y\ y'$, perforated, as described, and bolts whereby said parts are adjustably clamped through said perforations to said bracket and bar, substantially as set forth.

10. The combination, with the gang-yoke and scraper-bar, of the stop piece or plate $d^5$, having the part $d^6$ and the lip $d^7$, substantially as set forth.

11. The combination, with the end disk and hub provided with the shoulder $e'$, of the gang-yoke and the securing-yoke K, engaging said shoulder and bolted to the gang-yoke, substantially as set forth.

In testimony whereof we affix our signatures in the presence of two witnesses.

HENRY M. ROSE.
GEORGE L. ROSE.

Witnesses:
 WM. E. DEAN,
 HUMPHREY ROBERTS, Jr.